United States Patent
Ordonez et al.

(10) Patent No.: US 9,997,775 B1
(45) Date of Patent: Jun. 12, 2018

(54) RECONFIGURABLE LIQUID METAL AND GRAPHENE POWER SOURCE

(71) Applicant: THE UNITED STATES OF AMERICA AS REPRESENTED BY THE SECRETARY OF THE NAVY, Washington, DC (US)

(72) Inventors: Richard C. Ordonez, Mililani, HI (US); Nackieb M. Kamin, Kapolei, HI (US); David Garmire, Honolulu, HI (US); Cody K. Hayashi, Waipahu, HI (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 48 days.

(21) Appl. No.: 15/233,071

(22) Filed: Aug. 10, 2016

(51) Int. Cl.
| | |
|---|---|
| *H01G 9/04* | (2006.01) |
| *H01G 11/22* | (2013.01) |
| *H01M 4/38* | (2006.01) |
| *H01M 4/583* | (2010.01) |
| *H01M 2/30* | (2006.01) |
| *H01M 2/02* | (2006.01) |
| *H01M 4/02* | (2006.01) |

(52) U.S. Cl.
CPC .............. *H01M 4/38* (2013.01); *H01G 9/04* (2013.01); *H01G 11/22* (2013.01); *H01M 2/0277* (2013.01); *H01M 2/0285* (2013.01); *H01M 2/30* (2013.01); *H01M 4/583* (2013.01); *H01M 2004/021* (2013.01)

(58) Field of Classification Search
None
See application file for complete search history.

(56) References Cited

U.S. PATENT DOCUMENTS 5,462,821 A * 10/1995 Onoue .................. H01M 4/38
  204/292
8,940,145 B1   1/2015 Chen et al.
(Continued)

OTHER PUBLICATIONS

J. Che, T. Cagin, and W. A. Goddard III, "Thermal conductivity of carbon nanotubes," Nanotechnology, vol. 11, No. 2, p. 65, 2000.
(Continued)

*Primary Examiner* — Dion R Ferguson
(74) *Attorney, Agent, or Firm* — SPAWAR Systems Center Pacific; Kyle Eppele; Ryan Friedl

(57) ABSTRACT

A device includes an electrolyte disposed between a layer of graphene and liquid metal. A system based upon the device includes a substrate having first and second layers of graphene and an enclosure disposed thereon. The enclosure encases the first and second layers of graphene and has a channel formed therein. A first end of the channel is disposed over at least a portion of the first layer of graphene and a second end of the channel is disposed over at least a portion of the second layer of graphene. An electrolyte disposed within the channel. Liquid metal is disposed within the electrolyte such that the liquid metal is separated from the first layer of graphene and the second layer of graphene by the electrolyte. The liquid metal is movable within the electrolyte to reconfigure power delivery to different connected loads.

20 Claims, 4 Drawing Sheets

(56) References Cited

U.S. PATENT DOCUMENTS

| | | | |
|---|---|---|---|
| 9,704,654 B2* | 7/2017 | Li | H01G 11/26 |
| 2013/0036603 A1* | 2/2013 | Christian | B26B 21/222 |
| | | | 29/623.1 |
| 2014/0315097 A1* | 10/2014 | Tan | H01M 4/362 |
| | | | 429/300 |
| 2015/0333353 A1 | 11/2015 | Yazami et al. | |
| 2016/0086740 A1* | 3/2016 | Li | H01G 11/26 |
| | | | 361/502 |

OTHER PUBLICATIONS

A. K. Geim and K. S. Novoselov, "The rise of graphene," Nature materials, vol. 6, No. 3, pp. 183-191, 2007.

J. Ryu, Y. Kim, D. Won, N. Kim, J. S. Park, E.-K. Lee, D. Cho, S.-P, Cho, S. J. Kim, G. H. Ryu et al., "Fast synthesis of high performance graphene films by hydrogen-free rapid thermal chemical vapor deposition," ACS nano, vol. 8, No. 1, pp. 950-956, 2014.

X. Wang, H. Tian, M. A. Mohammad, C. Li, C. Wu, Y. Yang, and T.-L. Ren, "A spectrally tunable all-graphene-based flexible field-effect light-emitting device," Nature communications, vol. 6, 2015.

H. Y. Jeong, J. Y. Kim, J. W. Kim, J. O. Hwang, J.-E. Kim, J. Y. Lee, T. H. Yoon, B. J. Cho, S. O. Kim, R. S. Ruoff et al., "Graphene oxide thin films for flexible nonvolatile memory applications," Nano letters, vol. 10, No. 11, pp. 4381-4336, 2010.

G. A. Salvatore, N. Munzenrieder, T. Kinkeldei, L. Petti, C. Zysset, I. Strebel, L. Buthe, and G. Troster, "Wafer-scale design of lightweight and transparent electronics that wraps around hairs," Nature communications, vol. 5, 2014.

A. Pospischil, M. Humer, M. M. Furchi, D. Bachmann, R. Guider, T. Fromherz, and T. Mueller, "Cmos-compatible graphene photodetector covering all optical communication bands," Nature Photonics, vol. 7, No. 11, pp. 892-896, 2013.

J. Fan, J. Michalik, L. Casado, S. Roddaro, M. Ibarra, and J. De Teresa, "Investigation of the influence on graphene by using electron-beam and photo-lithography," Solid State Communications, vol. 151, No. 21, pp. 1574-1578, 2011.

R. D. P. Wong, J. D. Posner, and V. J. Santos, "Flexible microfluidic normal force sensor skin for tactile feedback," Sensors and Actuators A: Physical, vol. 179, pp. 62-69, 2012.

G. Maltezos, R. Nortrup, S. Jeon, J. Zaumseil, and J. A. Rogers, "Tunable organic transistors that use microfluidic source and drain electrodes," Applied physics letters, vol, 83, No. 10, pp. 2067-2069, 2003.

T. L. Liu, P. Sen, and C.-J. C. Kim, "Characterization of liquid metal galinstan R for droplet applications," in Micro Electro Mechanical Systems (MEMS), 2010 IEEE 23rd International Conference on. IEEE, 2010, pp. 560-563.

B. Xiaoping, L. Guowei, W. Wei, Z. Mingjiang, L. Wanhuan, Z. Libing, and Z. Yaping, "Contact surface condition effect on contact resistance and improving methods," in Electrical Contacts (ICEC 2012), 26th International Conference on. IET, 2012, pp. 368-374.

M. Read, J. Lang, A. Slocum, and R. Martens, "Contact resistance in flat thin films." Institute of Electrical and Electronics Engineers, 2009.

K, i Kemi, "Reactivity of galinstan with specific transition metal carbides," 2014.

P. Ahlberg, S. H. Jeong, M. Jiao, Z. Wu, U. Jansson, S.-L. Zhang, and Z.-B. Zhang, "Graphene as a diffusion barrier in galinstan-solid metal contacts," Electron Devices, IEEE Transactions on, vol. 61, No. 8, pp. 2996-3000, 2014.

L. Tan, M. Zeng, T. Zhang, and L. Fu, "Design of catalytic substrates for uniform graphene films: from solid-metal to liquid-metal," Nanoscale, vol. 7, No. 20, pp. 9105-9121, 2015.

R. C. Gough, A. M. Morishita, J. H. Dang, W. Hu, W. Shirorna, A. T, Ohta et al., "Continuous electrowetting of non-toxic liquid metal for rf applications," Access, IEEE, vol. 2, pp. 874-882, 2014.

M.A. Eddings, M. A. Johnson, and B. K. Gale, "Determining the optimal pdms—pdms bonding technique for microfluidic devices," Journal of Micromechanics and Microengineering, vol. 18, No. 6, p. 067001, 2008.

Norton, P. "HgCdTe infrared detectors," Optoelectronics review 3 (2002): 159-174.

Nair, R.R.; et. al. "Fine Structure Constant Defines Visual Transparency of Graphene". (2008). 320(1308).

Zhang, Yongzhe, et al. "Broadband high photoresponse from pure monolayer graphene photodetector." Nature communications (2013) 4(1811): 1-11.

Liu, T; Sen, P.; Kim, C. "Characterization of Nontoxic Liquid-Metal Alloy Galinstan for Applications in Microdevices," Microelectromechanical Systems, Journal of , (2012) 21(2): 443-450.

Deshpande, Rutooj D., et al. "Liquid metal alloys as self-healing negative electrodes for lithium ion batteries." Journal of the Electrochemical Society158.8 (2011): A845-A849.

M. Lin, et al. "An ultrafast rechargeable aluminum-ion battery." Nature vol. 520, Issue 7547, Apr. 2015.

D. Bradwell, H. Kim, A. Sirk, D. Sadoway. "Magnesium-Antimony Liquid Metal Battery for Stationary Energy Storage." Journal of the American Chemical Society. 2012, 134(4), pp. 1895-1897.

R. Deshpande, J. Li, Y. Cheng, M. Verbrugge. "Liquid Metal Alloys as Self-Healing Negative Electrodes for Lithium Ion Batteries." J. Electrochem. Soc. 2011 vol. 158, Issue 8, pp. A845-A849.

* cited by examiner

RECONFIGURABLE LIQUID METAL AND GRAPHENE POWER SOURCE

FEDERALLY SPONSORED RESEARCH AND DEVELOPMENT

The Reconfigurable Liquid Metal and Graphene Power Source is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 104039.

BACKGROUND OF THE INVENTION

As technological devices and circuitry become more complex, improved power sources are needed that possess high physical stability, provide a fast ion transport medium, are robust to stress, and can efficiently distribute power amongst various loads.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein relate to a power source using both liquid metal and graphene. The power source combines the high energy density graphene contact with the strain-robust liquid metal contact, providing a durable and flexible power source.

Figure 1:
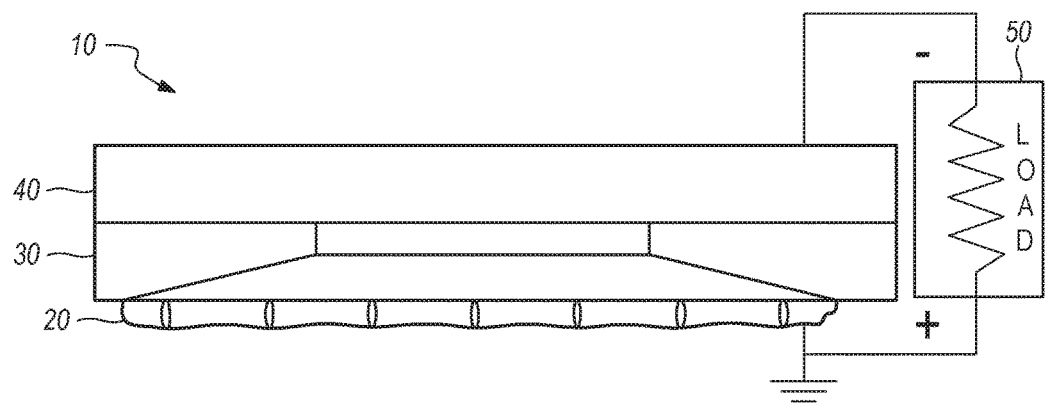
FIG. 1 shows a side perspective view of an embodiment of a device in accordance with the Reconfigurable Liquid Metal and Graphene Power Source.

A side perspective view of an embodiment of the reconfigurable liquid metal and graphene power source 10 is illustrated in FIG. 1 as a 3-layer stack. Power source 10 includes a layer of graphene 20, electrolyte 30, and liquid metal 40, with electrolyte 30 disposed between layer of graphene 20 and liquid metal 40. In some embodiments, layer of graphene 20 is a monolayer of graphene, having only a one atom thickness. In some embodiments, layer of graphene 20 comprises a multi-layer of graphene having a thickness of more than one atom.

Electrolyte 30 may comprise any type of electrolyte. As used herein, the term "electrolyte" refers to an ionic conductor that produces an electrically conducting solution when dissolved in a polar solvent. Electrolyte 30 may be in a solid state, including a gel form and dry polymer form, or in a liquid state. As an example, electrolyte 30 may comprise sodium hydroxide or potassium hydroxide.

Liquid metal 40 may comprise any alloy or combination of alloys with a low melting point which forms a eutectic that is liquid at room temperature. In some embodiments, liquid metal 40 comprises a eutectic alloy in stable liquid form at room temperature. In some embodiments, liquid metal 40 may comprise a gallium-based alloy. In some embodiments, the gallium-based alloy includes a combination of two or more of gallium, indium, and tin, such as the commercially-available Galinstan. Galinstan, which is comprised of gallium, indium, and tin, has an electrochemical equivalent of 23.24 grams per Coulomb, which is a smaller electrochemical equivalent than other popular anodes such as zinc and cadmium, and shows gallium's fairly large energy capacity per unit mass.

As shown in FIG. 1, power source 10 is connected to a load 50. Load 50 may comprise any type of load requiring a power source. For example, in embodiments where power source 10 is integrated into a micro-electrical-mechanical system (MEMS), power source 10 may be used to provide power one or more circuits within the MEMS. When connected to load 50, layer of graphene 20 becomes a cathode and liquid metal 40 becomes an anode.

Power source 10 generates power by liquid metal 40 creating an electrical double layer (EDL) in electrolyte 30, which stores electrical energy capacitively. Because graphene is noble, it is difficult to deteriorate if current is drawn. Similarly, liquid metal 40 may deteriorate (oxidize), but because it is liquid, it can readily reconfigure. Further, if liquid metal 40 does deteriorate, it can be "refreshed" by flushing current in reverse, thereby removing the oxide layer.

In one example embodiment of power source 10, layer of graphene 20 comprises a monolayer of graphene, electrolyte 30 comprises NaOH, and liquid metal 40 comprises Galinstan. In such embodiment, a voltage is produced through an electrochemical reaction of Galinstan and NaOH, which is stored across the EDL. The EDL voltage is configurable and rather dependent on the indirect relationship of the electrolyte ion concentration and the capacitance of the power cell.

Figure 2:
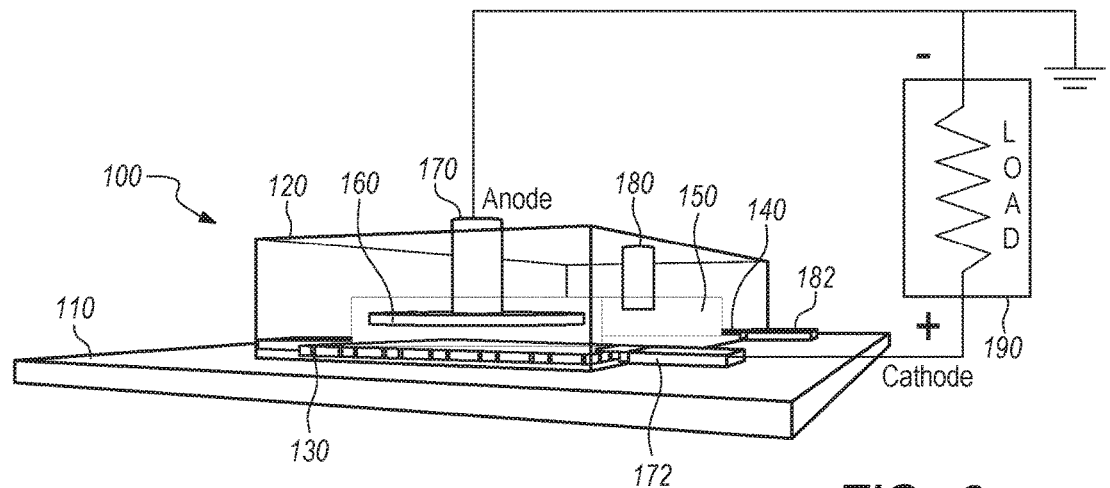
FIG. 2 shows a side perspective view of an embodiment of a reconfigurable power system in accordance with the Reconfigurable Liquid Metal and Graphene Power Source.

A single element can produce voltages on the order of 0.6V-1.2V, however, is not limited to this range and is given for comparison. As part of the reaction, $Ga(OH)_4^-$ forms and the surface of the gallium becomes negatively charged. Thus, liquid metal 40 is the anode and graphene 20 is the cathode of power source 10 as shown in FIG. 2. However, it should be recognized that liquid metal 40 may be the cathode and graphene 20 may be the anode if other materials and/or configurations are used.

FIG. 2 shows a side perspective view of an embodiment of a reconfigurable power system 100 in accordance with the Reconfigurable Liquid Metal and Graphene Power Source. System 100 will also be described with reference to FIGS. 3A-3D, which show top perspective views illustrating the operation of system 100, particularly the movement of the liquid metal within the system. Further, features of system 100 may be configured the same as similar features discussed above with reference to system 10.

System 100 includes a substrate 110 an enclosure 120 surrounding various components disposed on substrate 110. Substrate 110 may comprise various materials, such as a polymer, ceramic, elastomer, or undoped semiconductor. A first layer of graphene 130 and a second layer of graphene 140 are disposed on substrate 110. It should be recognized by a person having ordinary skill in the art that system 100 may be scaled to include more layers of graphene than shown in FIGS. 2 and 3A-3D. Enclosure 120 is disposed on substrate 110 and encases first layer of graphene 130 and second layer of graphene 140.

In some embodiments, enclosure 120 comprises a synthetic organic-based material. As an example, enclosure 120 may comprise a silicon-based material. In some embodiments, enclosure 120 comprises a polymer, an example of which is polyimide. Other non-limiting examples of materials for enclosure 120 include PET, PDMS, TPE, and PMMA. In some embodiments, the encasing material may be a rigid metal, silicon-based material, ceramic, or oil-based material. However, it should be understood that other types of materials currently known and not-yet-discovered, may be suitable for use as a material for enclosure 120 consistent with its use and disclosure herein, as would be recognized by a person having ordinary skill in the art.

Enclosure 120 has a channel formed therein. The channel comprises any space within which liquid metal 160 is free to move. Although the singular term "channel" is used herein, in some embodiments the "channel" includes multiple channels within which liquid metal 160 is free to move. As an example, the channel may comprise a series of nano-fluidic/micro-fluidic channels. The channels may vary in size and shape depending on the design or particular application of system 100.

Electrolyte 150 is disposed within the channel. As an example, electrolyte 150 is injected into the channel via a small hole within enclosure 120. In some embodiments, electrolyte 150 substantially fills the channel to allow for other material to be disposed within the channel to help actuate liquid metal 160 throughout the system. The channel may comprise various shapes. In some embodiments, and as shown in FIGS. 3A-3D, the channel has a "dog bone" shape, where the ends are substantially circular in shape and have widths that are greater than the width of the center portion. However, the channel may be shaped differently such that the ends have other shapes (e.g. oval, triangular, polygonal), such that the channel has only one continuous width, or such that the channel has one or more tapered widths.

The shape and configuration of the channel may depend in part upon which actuation technique is employed to transfer liquid metal 160 throughout the system. For example, if material is to be injected within the channel to begin the movement of electrolyte 150, the shape as shown in FIGS. 3A-3D may be employed.

The channel is configured such that it contacts at least a portion of first layer of graphene 130 and second layer of graphene 140. As shown in FIGS. 3A-3D, a first end 152 of the channel is disposed over at least a portion of first layer of graphene 130 and a second end 154 of the channel is disposed over at least a portion of second layer of graphene 140. This configuration allows for a power source to be created when liquid metal 160 is disposed over either first layer of graphene 130 or second layer of graphene 140. The position of liquid metal and layers of graphene within system 100 will determine the location of the power source in a large, sophisticated, or complex system.

Liquid metal 160 is disposed within electrolyte 150 such that liquid metal 160 is separated from first layer of graphene 130 and second layer of graphene 140 by electrolyte 150, as shown in FIG. 2. Liquid metal 160 is movable within electrolyte 150, as shown in FIGS. 3A-3D, which allows for the reconfigurability of power source 100. Liquid metal 160 may be actuated with a variety of mechanical and/or electrical actuation techniques to alter its size, shape, weight, volume, or location to tune the energy density or location of power draw, which is beneficial in a system such as an integrated circuit system. Further, the quantity, shape, and actuation techniques are not limited to only two sites, as is shown in FIGS. 3A-3D. Alternate embodiments of system 100 may be designed to include multiple sites to which power can be drawn to multiple loads.

In some embodiments, system 100 may utilize nano-fluidic/micro-fluidic injection with a syringe or sophisticated nano-scale pipetting system, continuous electro-wetting, electro-capillary deformation, or any combination of methods may be used to guide liquid metal 160 throughout any part of system 100 to provide effective switching of power amongst loads, such as shown in FIGS. 3A-3D.

As another example, a user can switch the battery connection amongst various loads by applying an electrical control voltage and actuating the liquid metal through the electrolyte. Moreover, if the loads possess varying compositions of material, the device can even provide separate voltages for each load based on the electrochemical reaction. The switching mechanism can temporarily disconnect either the liquid metal or graphene contact from the device to produce an open-circuit and avoid suffering any idle power losses. This can be performed in place of power-gating, which is typically done on integrated circuits, and still results in nominal static power losses. Similarly, the incident surface area of the liquid metal and the separation distance between liquid metal and graphene can be altered to create various capacitances produced by the EDL.

System 100 further includes a first electrical contact 170, second electrical contact 172, third electrical contact 180, and fourth electrical contact 182. However, it should be recognized that in some embodiments system 100 may include more or less electrical contacts depending upon the space requirements, design, and/or particular application for system 100. Electrical contacts 170, 172, 180, and 182 allow for system 100 to be connected to one or more loads requiring a power source, such as load 190 shown in FIG. 2, load 192 shown in FIG. 3A, and load 192 shown in FIG. 3D.

As shown in FIGS. 3A-3D, first electrical contact 170 is coupled to a first portion of first layer of graphene 130 and is at least partially within first end 152 of the channel.

Second electrical contact 172 is coupled to a second portion of first layer of graphene 130 and is outside of first end 152 of the channel. Third electrical contact 180 is coupled to a first portion of second layer of graphene 140 and is at least partially within second end 154 of the channel. Fourth electrical contact 182 is coupled to a second portion of second layer of graphene 140 and is outside of second end 154 of the channel.

As an example, electrical contacts 170, 172, 180, and 182 may comprise various metals such as liquid metal, standard metals, and/or carbon. Further, electrical contacts may comprise various compositions from one another to provide a different energy storage density and voltage produced. This can be done amongst the same device as well (i.e. various contacts that the liquid metal can be actuated towards to provide different voltages to different loads).

Additionally, the shape, size, or location of electrical contacts 170, 172, 180, and 182 is not limited, but may be selected such that the contact resistance at the graphene-electrode interface is minimized to maximize the energy which can be drawn out of the power source and to the load device. Also, electrical contacts 170 and 180, which are positioned to be in contact with liquid metal 160, may selected to minimize oxidation at the electrode-liquid metal interface, as liquid metals such as Galinstan have been proven to amalgamate with standard materials like gold, copper, and silver. Thus, a carbon, steel, or tungsten electrical contact may be desirable, as such materials have minimal oxidation effects with liquid metal.

Figure 3A:
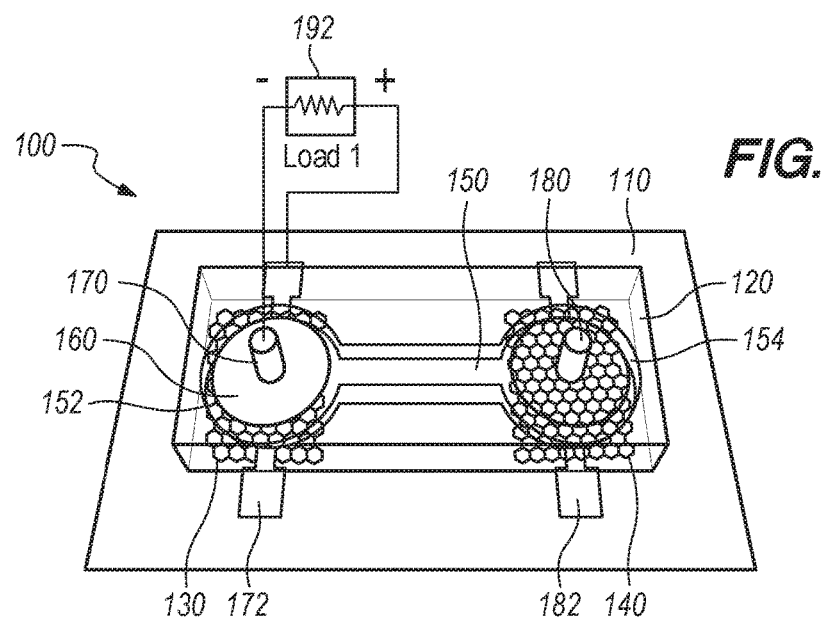
FIGS. 3A-3D show top perspective views illustrating the operation of the system shown in FIG. 2, particularly the movement of the liquid metal within the system.

Operation of system 100 will now be discussed with reference to FIGS. 3A-3D. Liquid metal 160 is injected via a small cavity (not shown) within enclosure 120 into the first end 152 of the channel to compete the first power source located at the first end of system 100 as shown in FIG. 3A, with the first power source comprising first layer of graphene 130, electrolyte 150, and liquid metal 160. Power from this first power source may be drawn to load 192 if a closed-loop circuit with load 192 is made.

Figure 3B:
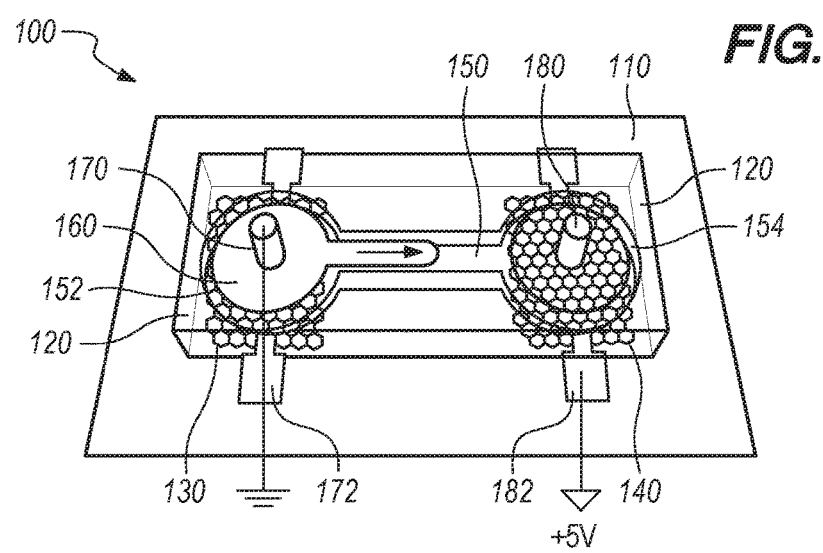

If power is required at a second power source located at the second end 154 of the channel, load 192 is disconnected to begin the process to transfer liquid metal 160 from the first end 152 of the channel to the second end 154 of the channel. To transfer liquid metal 160 to the second end 154 of the channel, an external bias of 5V is applied to electrical contact 182, with electrical contact 170 serving as ground, to draw liquid metal 160 out of the first end of the channel, through the central portion of the channel, and towards the second end 154 of the channel, as shown in FIG. 3B.

Figure 3C:
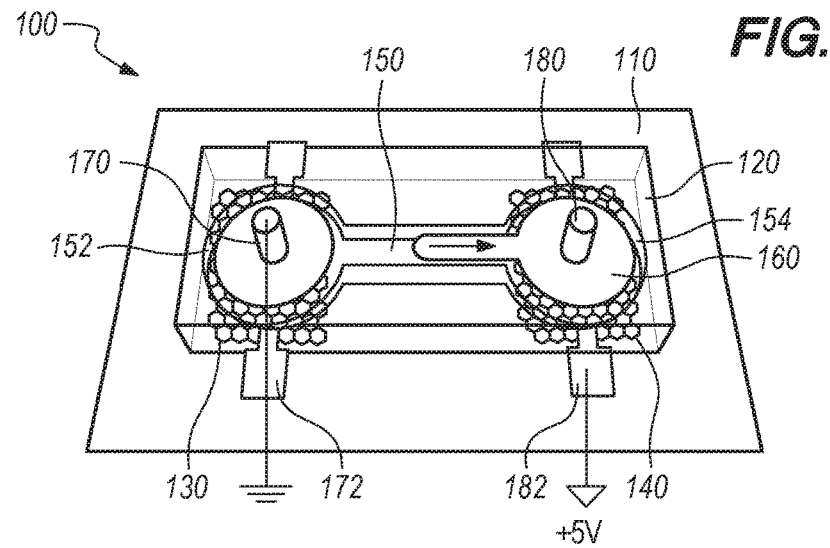

The transfer will be complete when greater than 50% of liquid metal 160 is in the second end 154 of the channel. The external bias can then be removed, and the remaining liquid metal 160 in the central portion of the transfer channel will be attracted to the liquid metal 160 within the second end 154 under its own surface energy, as shown in FIG. 3C.

Figure 3D:
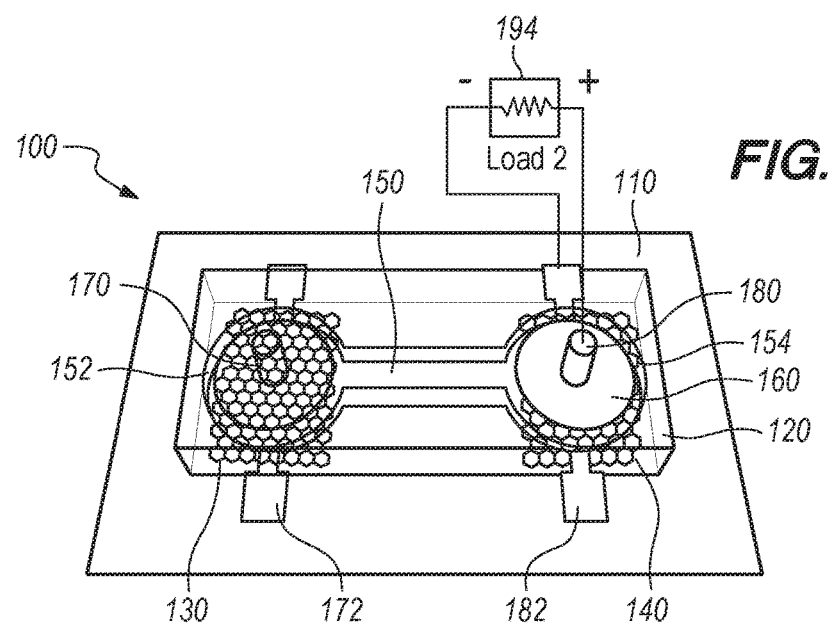

Liquid metal 160 is now in the second end 154 of the channel, completing the second power source as shown in FIG. 3D, with the second power source comprising second layer of graphene 140, electrolyte 150, and liquid metal 160. Power from the second power source may be drawn to a second load 194 if a closed-loop circuit with load 194 is made.

If desired, liquid metal 160 may be configured to return to first end 152 to power load 192 using the prior steps in reverse. Moreover, if loads 192 and 194 possess varying compositions of material, system 100 may provide separate voltages for each device based on the electrochemical reaction. Additionally, the switching mechanism discussed above can temporarily disconnect either the electrical contacts from the system to produce an open-circuit and avoid suffering any idle power losses. This can be done in lieu of power-gating, which is typically done on integrated circuits, and still results in nominal static power losses.

Figure 4:
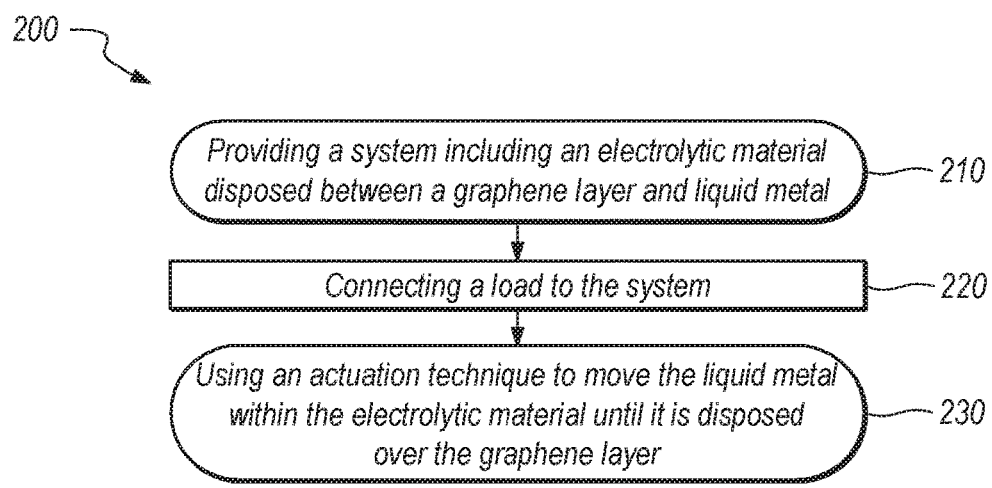
FIG. 4 shows a flowchart of an embodiment of a method for using an embodiment of the system in accordance with the Reconfigurable Liquid Metal and Graphene Power Source.

FIG. 4 shows a flowchart of an embodiment of a method 200 for using an embodiment of the system in accordance with the Reconfigurable Liquid Metal and Graphene Power Source. Method 200 will be discussed with reference to system 100 by way of example. Further, although method 200 includes steps 210-230, in some embodiments, method 200 may include additional steps.

Method 200 may begin with step 210, which involves providing a system such as system 100. Step 220 involves connecting one or more loads, such as loads 192 and 194, to system 100. Step 230 involves using an actuation technique to move liquid metal 160 within electrolyte 150 within system 100 until it is disposed over the graphene layer, such as first layer of graphene 130 or second layer of graphene 140, thus creating a power source that may be used to power one of the loads 192 or 194.

Many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

We claim:

1. A device comprising:
   a layer of graphene;
   a layer of liquid metal; and
   an electrolyte disposed between and directly contacting both of the layer of graphene and the layer of liquid metal.

2. The device of claim 1, wherein the electrolyte comprises sodium hydroxide.

3. The device of claim 1, wherein the layer of liquid metal comprises a eutectic alloy in stable liquid form over a temperature range of between about −19° C. and about 1300° C.

4. The device of claim 3, wherein the eutectic alloy is a gallium-based alloy.

5. The device of claim 4, wherein the gallium-based alloy comprises two or more of gallium, indium, and tin.

6. The device of claim 1, wherein the layer of graphene comprises monolayer graphene.

7. The device of claim 1, wherein the layer of graphene comprises multilayer graphene.

8. The device of claim 1 further comprising at least two electrical contacts, wherein a first electrical contact is in contact with the layer of graphene and a second electrical contact is in contact with the layer of liquid metal.

9. The device of claim 8 further comprising a load connected to the first electrical contact and the second electrical contact.

10. The device of claim 1, wherein the layer of graphene, the layer of liquid metal, and the electrolyte are disposed on a substrate and covered by an enclosure disposed on the substrate.

11. The device of claim 10, wherein the substrate comprises one of a polymer, a ceramic, an elastomer, and an undoped semiconductor and the enclosure comprises one of a polymer, a ceramic, and an elastomer.

12. The device of claim 1, wherein the electrolyte comprises a liquid.

13. The device of claim 1, wherein the electrolyte comprises a solid.

14. A system comprising:
a substrate;
a first layer of graphene and a second layer of graphene disposed on the substrate;
an enclosure, having a channel formed therein, disposed on the substrate and encasing the first layer of graphene and the second layer of graphene, wherein a first end of the channel is disposed over at least a portion of the first layer of graphene and a second end of the channel is disposed over at least a portion of the second layer of graphene;
an electrolyte disposed within the channel; and
liquid metal disposed within the electrolyte such that the liquid metal is separated from the first layer of graphene and the second layer of graphene by the electrolyte, wherein the liquid metal is movable within the electrolyte.

15. The system of claim 14 further comprising:
a first electrical contact coupled to a first portion of the first layer of graphene, wherein the first electrical contact is at least partially within the first end of the channel;
a second electrical contact coupled to a second portion of the first layer of graphene, wherein the second electrical contact is outside of the first end of the channel;
a third electrical contact coupled to a first portion of the second layer of graphene, wherein the third electrical contact is at least partially within the second end of the channel; and
a fourth electrical contact coupled to a second portion of the second layer of graphene, wherein the fourth electrical contact is outside of the second end of the channel.

16. The system of claim 15 further comprising a load connected to the first electrical contact and the second electrical contact.

17. The system of claim 15 further comprising a load connected to the third electrical contact and the fourth electrical contact.

18. A method comprising the steps of:
providing a system including a substrate, a first layer of graphene and a second layer of graphene disposed on the substrate, an enclosure having a channel formed therein disposed on the substrate and encasing the first layer of graphene and the second layer of graphene, wherein a first end of the channel is disposed over at least a portion of the first layer of graphene and a second end of the channel is disposed over at least a portion of the second layer of graphene, an electrolyte disposed within the channel, and liquid metal disposed within the electrolyte such that the liquid metal is separated from the first layer of graphene and the second layer of graphene by the electrolyte, wherein the liquid metal is movable within the electrolyte; and
using an actuation technique to cause the liquid metal to move within the electrolyte until it is at least substantially positioned above one of the first layer of graphene and the second layer of graphene.

19. The method of claim 18, wherein the system further comprises a first electrical contact coupled to a first portion of the first layer of graphene, wherein the first electrical contact is at least partially within the first end of the channel, a second electrical contact coupled to a second portion of the first layer of graphene, wherein the second electrical contact is outside of the first end of the channel, a third electrical contact coupled to a first portion of the second layer of graphene, wherein the third electrical contact is at least partially within the second end of the channel, and a fourth electrical contact coupled to a second portion of the second layer of graphene, wherein the fourth electrical contact is outside of the second end of the channel, the method further comprising the steps of:
connecting a first load to the first electrical contact and the second electrical contact; and
connecting a second load to the third electrical contact and the fourth electrical contact.

20. The method of claim 19, wherein the step of using an actuation technique comprises applying a voltage to one of the first electrical contact, the second electrical contact, the third electrical contact, and the fourth electrical contact to cause the liquid metal to move within the electrolyte until it is at least substantially positioned above one of the first layer of graphene and the second layer of graphene.

* * * * *